(12) United States Patent
Lim et al.

(10) Patent No.: US 11,284,428 B2
(45) Date of Patent: Mar. 22, 2022

(54) DYNAMIC C-DRX CONFIGURATION FOR BALANCE BETWEEN POWER SAVINGS AND COMMUNICATION EFFICIENCY, AND USE OF DCI FOR ACTIVATING CARRIER COMPONENTS

(71) Applicant: Apple Inc., Cupertino, CA (US)

(72) Inventors: Junsung Lim, San Jose, CA (US); Wei Zhang, Santa Clara, CA (US); Sami M. Almalfouh, San Jose, CA (US); Johnson O. Sebeni, Fremont, CA (US); Yuchul Kim, Santa Clara, CA (US); Wei Zeng, San Diego, CA (US); Haitong Sun, Irvine, CA (US); Pengkai Zhao, San Jose, CA (US); Ping Wang, San Jose, CA (US); Dawei Zhang, Saratoga, CA (US); Fangli Xu, Beijing (CN); Yuqin Chen, Shenzhen (CN); Haijing Hu, Beijing (CN)

(73) Assignee: Apple Inc., Cupertino, CA (US)

( * ) Notice: Subject to any disclaimer, the term of this patent is extended or adjusted under 35 U.S.C. 154(b) by 325 days.

(21) Appl. No.: 16/499,178

(22) PCT Filed: Aug. 10, 2018

(86) PCT No.: PCT/CN2018/099888
§ 371 (c)(1),
(2) Date: Sep. 27, 2019

(87) PCT Pub. No.: WO2020/029230
PCT Pub. Date: Feb. 13, 2020

(65) Prior Publication Data
US 2021/0360674 A1    Nov. 18, 2021

(51) Int. Cl.
H04W 72/12 (2009.01)
H04L 5/00 (2006.01)
H04W 52/02 (2009.01)

(52) U.S. Cl.
CPC ......... *H04W 72/1289* (2013.01); *H04L 5/001* (2013.01); *H04L 5/0053* (2013.01); *H04L 5/0098* (2013.01); *H04W 52/0216* (2013.01)

(58) Field of Classification Search
CPC ..... H04L 5/001; H04L 5/0053; H04L 5/0098; H04W 52/0216
(Continued)

(56) References Cited

U.S. PATENT DOCUMENTS

| 2011/0199908 A1* | 8/2011 | Dalsgaard | H04W 24/10 370/241 |
| 2019/0305867 A1* | 10/2019 | Tseng | H04W 24/10 |
| 2020/0178261 A1* | 6/2020 | Ioffe | H04L 1/1812 |

FOREIGN PATENT DOCUMENTS

| CA | 2775305 A1 * | 3/2011 | ......... H04W 74/002 |
| WO | WO 2014145102 A1 | 9/2014 | |

(Continued)

OTHER PUBLICATIONS

MediaTek Inc.; "Summary of Bandwidth Part Remaining Issues"; R1-1803294; 3GPP TSG RAN WG1 Meeting #92; Mar. 2, 2018; 15 pages.

(Continued)

*Primary Examiner* — Peter G Solinsky
(74) *Attorney, Agent, or Firm* — Kowert, Hood, Munyon, Rankin & Goetzel, P.C.

(57) ABSTRACT

A device may monitor a first search space (SS) corresponding to an active first component carrier (CC), and detect first control information (CI) that identifies an inactive second CC. In response to receiving the first CI, the device may (Continued)

activate the inactive second CC to make it an active second CC. The device may also set up a second SS corresponding to the active second CC, and may monitor the second SS to schedule the active second CC and receive a physical data channel. The first CI may also include additional scheduling information and a start time for reception of the physical data channel. The device may operate in a first bandwidth part (BWP) according to a first communication configuration associated with the first bandwidth part, and may switch to operating in a second BWP and to operating according to a second communication configuration associated with the second BWP.

20 Claims, 10 Drawing Sheets

(58) Field of Classification Search
USPC .......................................................... 370/311
See application file for complete search history.

(56) References Cited

FOREIGN PATENT DOCUMENTS

| WO | WO 2016133777 A1 | 8/2016 | | |
|---|---|---|---|---|
| WO | WO-2020029230 A1 | * | 2/2020 | ............. H04L 5/001 |

OTHER PUBLICATIONS

Qualcomm Incorporated; Open Issues on BWP; R1-1718580; 3GPP TSG RAN WG1 #90bis; Oct. 13, 2017; eight pages.

* cited by examiner

| | # of bits | Comment |
|---|---|---|
| Carrier indicator | 0/3 | (High layer Config) |
| Identifier for DCI format | 1 | Set to 1 |
| BWP indicator | 0/1/2 | (High layer Config) |
| Freq domain resource assignment | | Depending on allocation type 0,1, both |
| Time domain resource assignment | 0/1/2/3/4 | (High layer Config) |
| VRB-to-PRB | 0/1 | [Need to check] (High layer Config) |
| PRB bundling size indicator | 0/1 | (High layer Config) |
| Rate matching indicator | 0/1/2 | (High layer Config) |
| ZP CSI-RS Trigger | 0/1/2 | (High layer Config) |
| MCS (each TB) | 5 | |
| NDI (each TB) | 1 | |
| RV (each TB) | 2 | |
| HARQ Process number | 4 | |
| Downlink assignment index | 0/2/4 | (High layer Config) |
| TPC Command | 2 | |
| PUCCH resource indicator | 3 | |
| PDSCH-to-HARQ feedback timing | 3 | |
| Antenna ports | 4/5/6 | |
| TCI | 0/3 | (High layer Config) |
| SRS Request | 2/3 | (High layer Config) |
| CBG transmission info | 0/2/4/6/8 | (High layer Config) |
| CBG flushing out info | 0/1 | (High layer Config) |
| DMRS sequence initialization | 1 | |

FIG. 11

DYNAMIC C-DRX CONFIGURATION FOR BALANCE BETWEEN POWER SAVINGS AND COMMUNICATION EFFICIENCY, AND USE OF DCI FOR ACTIVATING CARRIER COMPONENTS

FIELD OF THE INVENTION

The present application relates to wireless communications, and more particularly to the use of downlink control information (DCI) for activating carrier components, and dynamic connected mode discontinuous reception (C-DRX) configuration to tradeoff between power saving and communications traffic, e.g. in New Radio (NR) wireless communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

The ever increasing number of features and functionality introduced in wireless communication devices also creates a continuous need for improvement in both wireless communications and in wireless communication devices. In particular, it is important to ensure the accuracy of transmitted and received signals through user equipment devices (UEs), e.g., through wireless devices such as cellular phones, base stations, access points, relay stations, etc. used in wireless cellular communications. The UEs, which may be mobile telephones or smart phones, portable gaming devices, laptops, wearable devices, PDAs, tablets, portable Internet devices, music players, data storage devices, or other handheld devices are generally powered by a portable power supply, e.g., a battery. There are ongoing efforts to reduce power consumption required to perform wireless communications in order to improve the battery life of wireless devices, while simultaneously achieving efficient use of wireless communication resources. Finding a tradeoff between power savings and wireless communications traffic is becoming increasingly more challenging as the features and functionality of wireless communication devices keep expanding.

Other corresponding issues related to the prior art will become apparent to one skilled in the art after comparing such prior art with the disclosed embodiments as described herein.

SUMMARY OF THE INVENTION

Embodiments are presented herein of, inter alia, of methods and procedures for novel dynamic connected-mode discontinuous reception (C-DRX) configuration for efficient tradeoff between power savings and wireless communications traffic, and the use of downlink control information (DCI) for activation of carrier components, e.g. in New Radio (NR) systems, among others. Embodiments are further presented herein for wireless communication systems containing wireless communication devices (UEs) and/or base stations (e.g. gNB) and access points (APs) communicating with each other within the wireless communication systems.

Accordingly, in some embodiments, a device may monitor a first search space corresponding to an active first component carrier (e.g. corresponding to a primary cell in an NR wireless network), and may detect first control information (e.g. downlink control information, DCI) as a result of the monitoring of the first search space. The first control information may include a carrier indicator (e.g. a carrier indicator field, CIF) identifying an inactive (or deactivated) second component carrier (e.g. corresponding to a secondary cell in the NR wireless network). The device may activate the inactive second component carrier to make it an active second component carrier, at least in response to detecting the first control information. The device may also set up a second search space corresponding to the active second component carrier, monitor the second search space, and may decode a physical control channel in the second search space. The device may then receive a (first) physical data channel according to at least the decoding of the physical control channel.

The device may receive the (first) physical data channel at a point in time determined based at least on timing information included in the first control information. In some embodiments, the device may detect second control information, which may include a carrier indicator identifying the active second component carrier, as a result of monitoring the second search space, and may schedule the active second component carrier at least in response to detecting the second control information. In some embodiments, the device may detect, subsequent to the activation of the inactive second component carrier, second control information as a result of the monitoring of the first search space, with the second control information including a carrier indicator identifying the active second component carrier. The device may then schedule the active second component carrier at least in response to detecting the second control information.

In some embodiments, the device may operate in a first bandwidth part of the active first component carrier according to a first communication configuration associated with the first bandwidth part, and may detect second control information as a result of the monitoring of the first search space. The device may switch, in response to at least the second control information, from operating in the first bandwidth part to operating in a second bandwidth part of the of the active first component carrier, and from operating according to the first communication configuration to operating according to a second communication configuration in the second bandwidth part, with the second communication configuration associated with the second bandwidth part. The second communication configuration may be part of a first set of communication configurations associated with the second bandwidth part, and may be selected by the UE, e.g. based at least on an indication included in the second control information, from among the set of communication configurations.

Further to the above, a network device (e.g. a base station, such as a gNB in an NR wireless network) may identify an active first component carrier having a corresponding first search space suitable for transmitting control information associated with other component carriers. The network device may configure first control information, which may be used by a second device to activate and schedule a deactivated second component carrier to make it an active second component carrier, and may transmit the first control information in the first search space. The network device may configure the first control information to include at least a carrier indicator identifying the deactivated second component carrier, and a start time indicative of when the second device is to receive a physical data channel. The first control information may also include additional scheduling information. The network device may configure the first control information and transmit the configured first control information for each scheduling instance of multiple scheduling instances.

The network device may also configure, for transmittal in the first search space, second control information, which may be used by the second device to schedule the active second component carrier, and transmit the second control information in the first search space. Optionally, the network device may configure, for transmittal in a second search space associated with the active second component carrier, second control information, which may be used by the second device to schedule the active second component carrier, and may transmit the second control information in the second search space.

In some embodiments, for an improved balance between power savings and network data traffic for a device operating in a wireless network (e.g. an NR wireless network), a bandwidth-part-specific (BWP-specific) communication configuration (e.g. C-DRX configuration) design may be implemented. Accordingly, instead of one short/long C-DRX configuration (e.g. one configuration for long C-DRX or short C-DRX) in RRC, multiple, BWP-specific C-DRX configurations may be established. When the device switches from operating in a first BWP to operating in a second BWP, the device may also switch from a current C-DRX configuration associated with the first BWP to a (different) C-DRX configuration associated with the second BWP. Furthermore, more than one C-DRX configuration may be associated with each BWP, and selection of the C-DRX configuration to use (by the device) may be communicated to the device via DCI or a media access control (MAC) control element (MAC-CE). For example, the DCI and/or MAC-CE may include an index that indicates which C-DRX configuration of the multiple C-DRX configurations the device is to select and to use.

Different C-DRX configurations for different BWPs may be designated/determined based on one or more parameters associated with wireless communications conducted by the device, e.g. subcarrier spacing (SCS), bandwidth (BW), traffic type, quality of service (QoS), signal-to-noise ratio (SNR) level, etc., in order to provide flexibility for different modes/levels of power savings. When multiple C-DRX configurations are set up for the device, one default C-DRX configuration may be specified, so when the device switches BWPs based on a timer (e.g. as opposed to switching based on a received DCI), the device may fall back to the default C-DRX configuration. With more than one C-DRX configuration, the device may also be instructed which C-DRX configurations to select without changing the BWP, either through DCI or MAC-CE. With DCI-based BWP and BWP-specific C-DRX switching, the position of the first grant in the C-DRX cycle may be implicitly understood as the C-DRX cycle offset.

Pursuant to the above, the device may operate in a first bandwidth part of a frequency band of the wireless network according to a first communication configuration associated with the first bandwidth part, and when switching from operating in the first bandwidth part to operating in a second bandwidth part of the of frequency band, the device may also switch from operating according to the first communication configuration (e.g. a first C-DRX configuration) to operating according to a second communication configuration (e.g. a second C-DRX configuration) associated with the second bandwidth part. The device may switch to operating in the second bandwidth part and to operating according to the second communication configuration in response to receiving control information from the wireless network, with the control information indicating that the device is to switch to operating in the second bandwidth part, or in response to the expiration of a bandwidth part inactivity timer.

In some embodiments, the second communication configuration may be part of a first set of communication configurations associated with the second bandwidth part, with the device selecting the second communication configuration from among the set of communication configurations. The device may select the second communication configuration based at least on an indication in control information received from the wireless network, with the control information indicating that the device is to switch to operating in the second bandwidth part.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 11 shows a table illustrating the exemplary contents of a DCI used for activating a CC, according to some embodiments.

Figure 1:
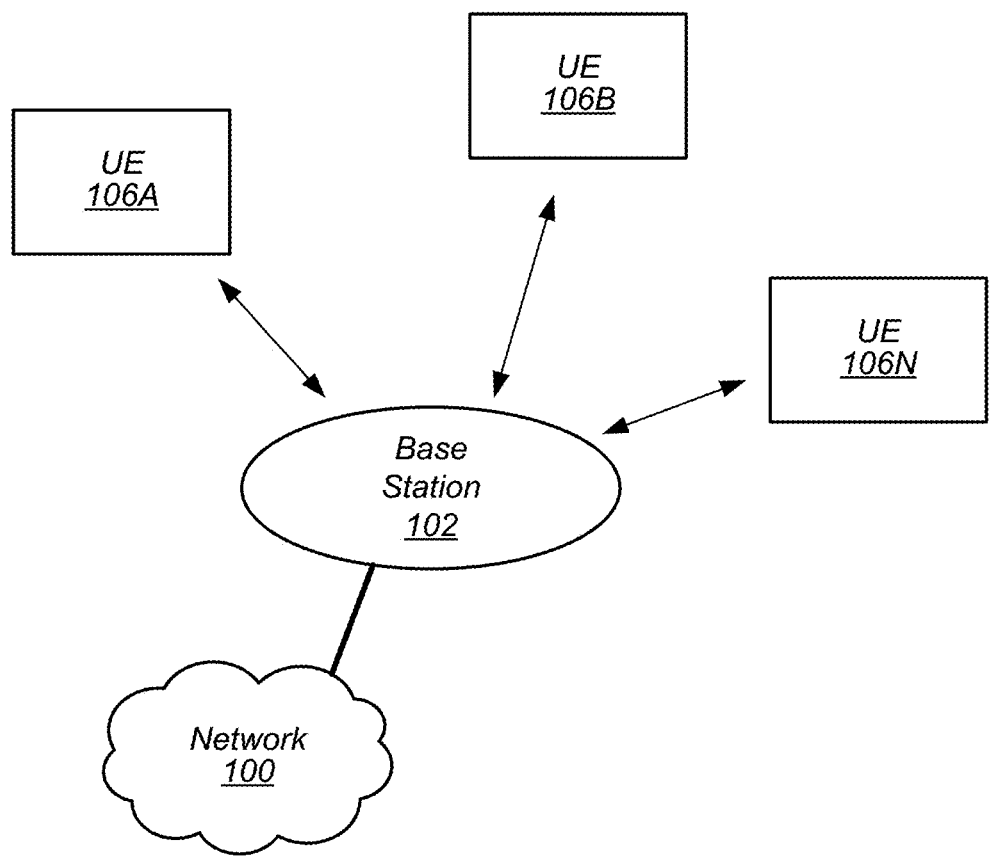
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMF: Access and Mobility Management Function
AMR: Adaptive Multi-Rate
AP: Access Point
APN: Access Point Name
APR: Applications Processor
AUL: Autonomous Uplink Transmission(s)
BS: Base Station
BSR: Buffer Size Report
BSSID: Basic Service Set Identifier
BWP: Bandwidth Part
C-DRX: Connected-mode Discontinuous Reception
CBRS: Citizens Broadband Radio Service
CBSD: Citizens Broadband Radio Service Device
CCA: Clear Channel Assessment
CIF: Carrier Indicator Field
CMR: Change Mode Request
CS: Circuit Switched
CSI: Channel State (Status) Information
DCI: Downlink Control Information
DL: Downlink (from BS to UE)
DRX: Discontinuous Reception
DSDS: Dual SIM Dual Standby
DYN: Dynamic
EDCF: Enhanced Distributed Coordination Function
FDD: Frequency Division Duplexing
FO: First-Order state
FT: Frame Type
GAA: General Authorized Access
GPRS: General Packet Radio Service
GSM: Global System for Mobile Communication
GTP: GPRS Tunneling Protocol
IMS: Internet Protocol Multimedia Subsystem
IMSI: International Mobile Subscriber Identity
IP: Internet Protocol
IR: Initialization and Refresh state
KPI: Key Performance Indicator
LAN: Local Area Network
LBT: Listen Before Talk
LQM: Link Quality Metric
LTE: Long Term Evolution
MNO: Mobile Network Operator
NAS: Non-Access Stratum
NB: Narrowband
NG-RAN: Next Generation Radio Access Network
NR: New Radio
NR-U: New Radio Unlicensed Spectrum
OOS: Out of Sync
PAL: Priority Access License
PDCCH: Physical Downlink Control Channel
PDCP: Packet Data Convergence Protocol
PDN: Packet Data Network
PDSCH: Physical Downlink Shared Channel
PDU: Protocol Data Unit
PGW: PDN Gateway
PLMN: Public Land Mobile Network
PSD: Power Spectral Density
PSS: Primary Synchronization Signal
PT: Payload Type
PUSCH: Physical Uplink Shared Channel
QBSS: Quality of Service Enhanced Basic Service Set
QI: Quality Indicator
QoS: Quality of Service
RAN: Radio Access Network
RAT: Radio Access Technology
RF: Radio Frequency
RNA: RAN-based Notification Area
RNTI: Radio Network Temporary Identifier
ROHC: Robust Header Compression
RTP: Real-time Transport Protocol
RTT: Round Trip Time
RX: Reception/Receive
SAS: Spectrum Allocation Server
SID: System Identification Number
SIM: Subscriber Identity Module
SGW: Serving Gateway
SMB: Small/Medium Business
SS: Search Space
SSS: Secondary Synchronization Signal
TBS: Transport Block Size
TCP: Transmission Control Protocol
TDD: Time Division Duplexing
TX: Transmission/Transmit
UE: User Equipment
UL: Uplink (from UE to BS)
UMTS: Universal Mobile Telecommunication System
USIM: UMTS Subscriber Identity Module
WB: Wideband
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing one or more functions in a device, e.g. in a user equipment device or in a cellular network device, and/or cause the user equipment device or cellular network device to perform one or more functions. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
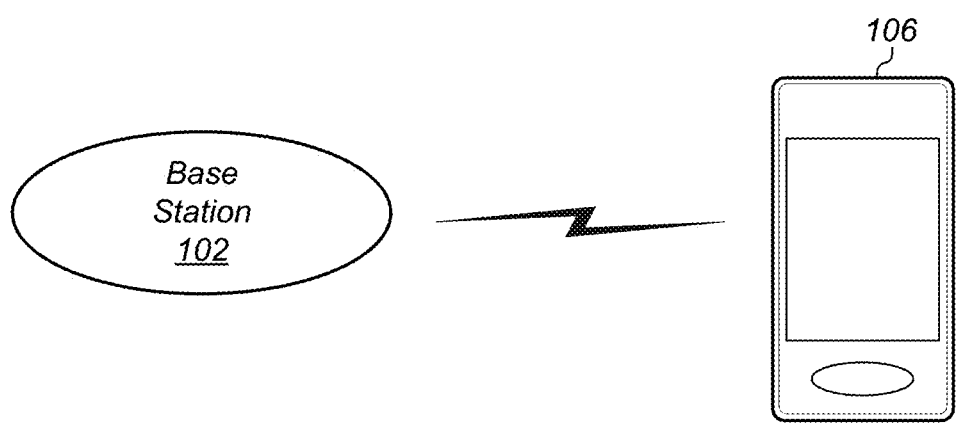
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106 are referred to as UEs or UE devices. Various ones of the UE devices may operate to implement dynamic connected-mode discontinuous reception (C-DRX) configuration for efficient tradeoff between power savings and wireless communications traffic, and the use of downlink control information (DCI) for activation of carrier components.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, neutral host or various CBRS deployments, among various possibilities). Thus, the base station 102 may facilitate communication between the user devices and/or between the user devices and the network 100. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. In some embodiments, the base station 102 may communicate with at least one UE, implementing dynamic connected-mode discontinuous reception (C-DRX) configuration for efficient tradeoff between power savings and wireless communications traffic, and the use of downlink control information (DCI) for activation of carrier components as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE and/or NR communications may be performed over a primary licensed spectrum as well as over an unlicensed spectrum. Overall, the use of various terms and expressions will always be clearly indicated with respect to and within the context of the various applications/embodiments under consideration.

As mentioned above, UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) in communication with the base station 102, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH'. Other configurations are also possible.

Figure 3:
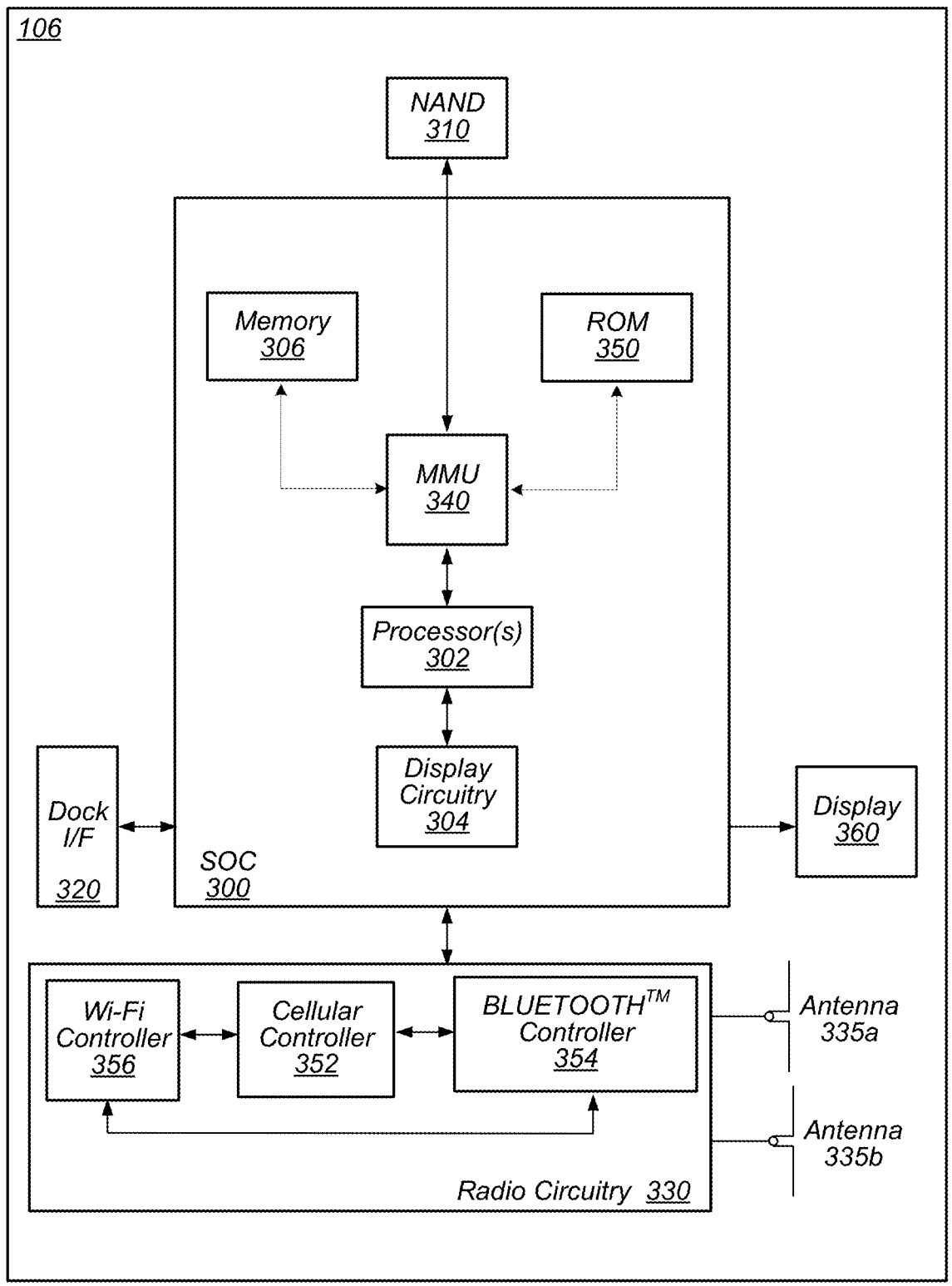
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing dynamic connected-mode discontinuous reception (C-DRX) configuration for efficient tradeoff between power savings and wireless communications traffic, and the use of downlink control information (DCI) for activation of carrier components as further detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement dynamic connected-mode discontinuous reception (C-DRX) configuration for efficient tradeoff between power savings and wireless communications traffic, and the use of downlink control information (DCI) for activation of carrier components according to various embodiments disclosed herein. Specifically, processor(s) 302 may be coupled to and/or may interoperate with other components as shown in FIG. 3 to facilitate dynamic connected-mode discontinuous reception (C-DRX) configuration, and the use of DCI for activation of carrier components. Processor(s) 302 may also implement various other applications and/or end-user applications running on UE 106.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106.

Figure 4:
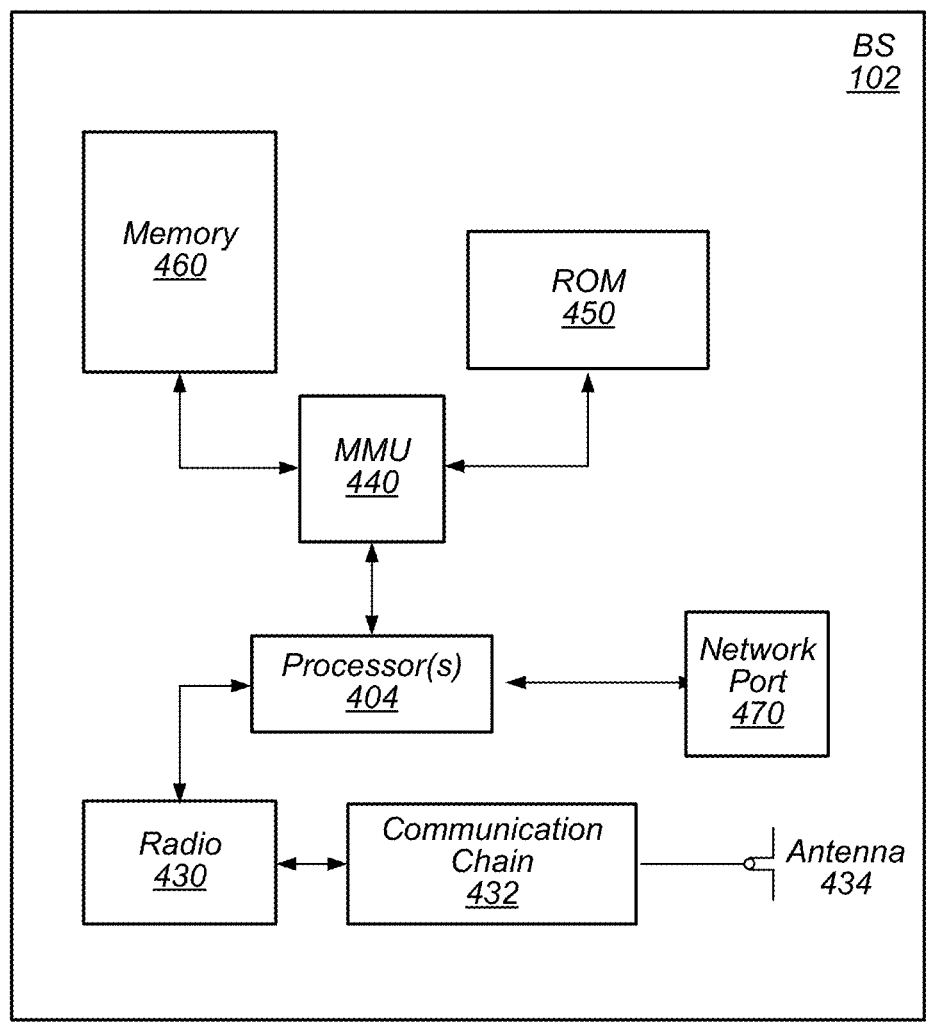
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to implement dynamic C-DRX configuration for efficient tradeoff between power savings and wireless communications traffic, and the use of DCI for activation of carrier components. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for implementing dynamic C-DRX configuration for efficient tradeoff between power savings and wireless communications traffic, and the use of DCI for activation of carrier components, according to various embodiments described herein.

Figure 5:
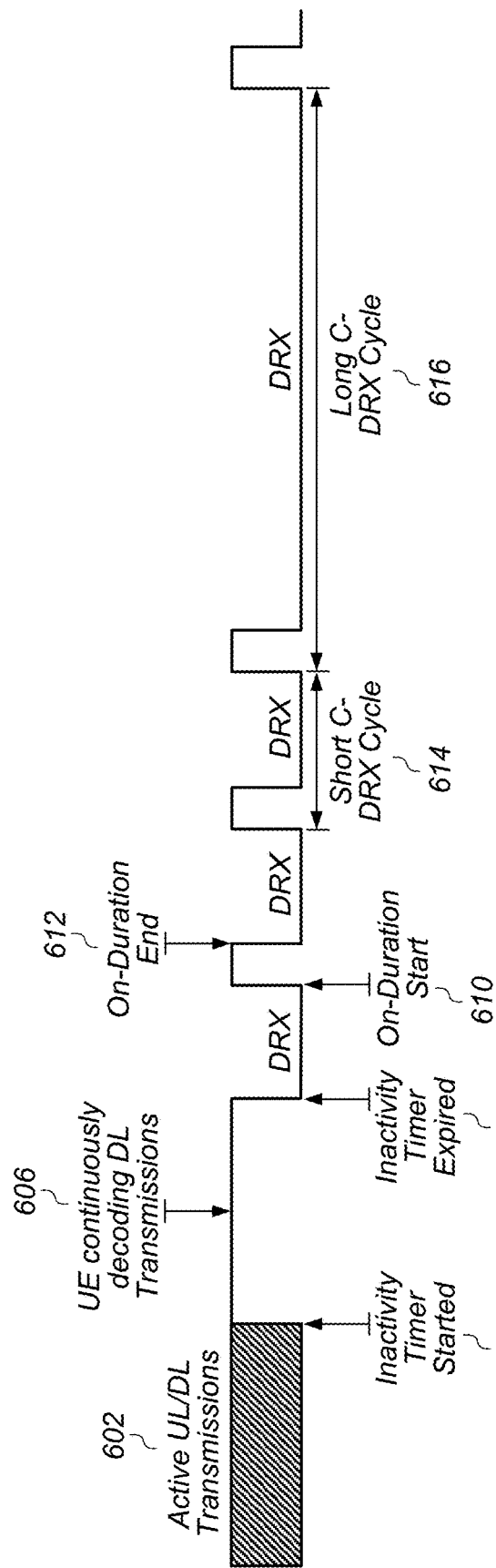
FIG. 5 shows an exemplary timing diagram illustrating general operations of a C-DRX capable UE over a period of time, according to some embodiments.

FIG. 5—DRX Communications

One power saving technique developed to save power in transceiver circuitry is known as discontinuous reception (or DRX). In devices utilizing DRX, portions of wireless circuitry may be powered down if there is no information (e.g., packets) to be received or transmitted. The wireless circuitry may periodically be powered on to determine if there is information to be received, and subsequently powered back down again if such a determination indicates that no new information is incoming. A device utilizing DRX may determine from a header in a transmitted packet if the information contained therein is incoming for that device. If the information is not relevant to that device, then circuitry may be powered down for at least a portion of the remainder of the packet, and subsequently powered on before the next header. Polling is another technique that may be used, wherein a device may periodically send a beacon to an access point or base station to determine if there is any information waiting for reception. If no information is awaiting reception, portions of the wireless circuitry may be powered down until the next beacon is to be transmitted. In addition to determining if information is awaiting reception by the mobile device, neighbor cell searching may be conducted during the time when the wireless circuitry is powered up while operating in a DRX mode. Neighbor cell searching may be performed in order to enable cell reselection and handover of the mobile device from one cell to another.

In general, DRX has been introduced in several wireless standards such as UMTS (Universal Mobile Telecommunications System), LTE (Long-term evolution), New Radio (NR or NR-5G), WiMAX, etc., which powers down most of user equipment (UE) circuitry when there are no packets to be received or transmitted, and only wakes up at specified times or intervals to listen to the network. DRX can be enabled in different network connection states, including connected mode and idle mode. In connected DRX (C-DRX) mode, the UE listens to the downlink (DL) packets following a specified pattern determined by the base-station (BS). In idle DRX (I-DRX) mode, the UE listens to the page from the BS to determine if it needs to reenter the network and acquire the uplink (UL) timing. Because DRX allows the UE to switch off its transceiver circuitry for short intervals when there is no data to receive or transmit, and start "wake up and sleep" cycles to check whether there is data to send or receive, operating in C-DRX mode helps decrease battery usage.

Another aspect of wireless data transmission is scheduling. In most cases, scheduling is fully dynamic. In a downlink direction, resources are assigned when data is available. For data to be sent in the uplink direction, the UE dynamically requests transmission opportunities whenever data arrives in the UE's uplink buffer. Information about data being sent in the downlink direction, and uplink transmission opportunities are carried in the radio layer control channel, which is sent at the beginning of each subframe. While dynamic scheduling is efficient for infrequent and bandwidth consuming data transmissions, which may result in large data bursts (e.g. web surfing, video streaming, emails), it is less suited for real time streaming applications such as voice calls. In the latter cases, data is sent in short bursts at regular intervals. If the data rate of the stream is very low, as is the case for voice calls, the overhead of the scheduling messages can become very high, as only little data is sent for each scheduling message.

One solution to this issue has been semi-persistent scheduling (SPS). Instead of scheduling each uplink or downlink transmission, a transmission pattern is defined instead of single opportunities. This significantly reduces the scheduling assignment overhead. During silence periods, the wireless voice CODECs in UEs stop transmitting voice data, and only send silence description information with much longer time intervals in between. During those times of silence the persistent scheduling can be switched-off. In the uplink, the SPS grant scheme is implicitly canceled if no data is sent for a network-configured number of empty uplink transmission opportunities. In downlink direction, SPS is canceled with an RRC (Radio Resource Control) message. The parameters for DRX cycles may be configured by the BS through different timers. The DRX inactivity timer indicates the time in number of consecutive subframes to wait before enabling DRX. Short DRX cycles and long DRX cycles are defined to allow the BS to adjust the DRX cycles based on the applications. In generation, a DRX short cycle timer may be defined to determine when to transition to the long DRX cycle. When there is no reception of packets for an extended period of time after the successful reception of a packet, the BS may initiate RRC connection release and the UE may enter the RRC IDLE state, during which the idle DRX can be enabled. The On-Duration timer may be used to determine the duration over which the UE will read the DL control channel every DRX cycle before entering power saving mode. The allowed values are 1, 2, 3, 4, 5, 6, 8, 10, 20, 30, 40, 50, 60, 80, 100, and 200. During idle DRX mode, the UE may monitor one paging occasion (PO) per DRX cycle, which is one subframe.

FIG. 5 illustrates various aspects of general C-DRX operation, according to some embodiments. As indicated by 602, the UE 106 may operate in an active state and may perform one or more uplink and/or downlink (UL/DL) transmissions (e.g., transmit uplink data and/or receive downlink data). At 604, an inactivity timer may be initiated. The inactivity timer may be initiated at the end of the active transmissions in 602. Note that the inactivity timer may have been initiated one or more times during the active transmissions in 6502, but may have been reset each time as a result of continuing activity (transmissions) until no more activity was observed at 604, at which point it may run until expiration at 608. The inactivity timer may have any length, as desired; some examples of possible inactivity timer length might include 100 ms, 80 ms, 50 ms, 40 ms, or any other value, e.g., as specified by the 3GPP TS 38.331 specification.

In 606, between initiation (at 604) and expiration (at 608) of the inactivity timer, the UE 106 may not be performing any uplink or downlink transmissions, but may continue to operate in the active state, and may monitor one or more communication channels (e.g., a PDCCH) for downlink grants. At 608, the inactivity timer may expire. At this point the UE 106 may transition to a reduced-power state (DRX), as a result of having observed a sufficient period of data communication inactivity (e.g., as indicated by the expiration of the inactivity timer). During the period of time that the UE 106 is operating in the reduced-power state, the UE 106 may power down and/or reduce power to one or more components, such as baseband logic components and/or radio components.

At 610, the UE 106 may "wake-up" and re-enter the active state. The UE 106 may wake up at a time specified by a scheduler, e.g., of which it may be informed by a base station (e.g., an eNode-B, in LTE). At the specified time (or after a specified interval), the base station may notify the UE 106 of a downlink grant for the UE 106, if there is any downlink data pending, so the UE 106 may check (e.g., monitor a communication channel such as a PDCCH) for downlink grants during this time. One or more other functions may also be performed during this time, if desired. This time period may also be referred to as the "on-duration" in C-DRX operation. According to some embodiments, the on-duration may last a specified length of time, such as 5 ms, or 10 ms, or another length of time, e.g., as specified by the 3GPP TS 38.331 specification; alternatively, the on-duration may last until certain functions have been performed, and may end when no further specified functions need to be performed. At 612, the on-duration may end, and if no downlink grants were received during the on-duration, the UE 106 may go back to "sleep" and transition back into the reduced-power state. Any number of subsequent cycles of sleeping (DRX) and waking (on-duration) may be performed, as desired.

Note that the UE 106 may also be configured to transition between C-DRX cycles with different lengths. For example, as shown, the UE 106 may perform up to a pre-determined number (such as 2, 4, 8, 16, etc.) of "short C-DRX" cycles 614 (which may last 20 ms, 40 ms, 80 ms, or any other length of time), and if no uplink or downlink transmission are performed by the end of the pre-determined number of cycles, the UE 106 may perform one or more "long C-DRX" cycles 616 (which may last 80 ms, 160 ms, 320 ms, or any other length of time, e.g., as specified by 3GPP TS 38.331), which may specify a longer period of reduced-power state operation before waking up for active state on-duration operations. The long C-DRX cycles may continue until further active communication (e.g., which may be initiated either by the UE 106 or the network) occurs, or one or more other conditions occur which might cause the UE 106 to transition away from the long C-DRX cycles.

If active communications are again initiated at some subsequent time, the UE 106 may perform similar steps (e.g., monitoring activity/inactivity via an inactivity timer and initiating one or more C-DRX cycles if sufficient inactivity is seen between active communications) if appropriate, e.g., depending on communication activity.

Physical Channels

The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information or Indicator (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Carrier Aggregation

In LTE and NR, carrier aggregation (CA) refers to the process of aggregating two or more component carriers (CCs) in order to support wider transmission bandwidths, e.g. bandwidths of up to 100 MHz. A UE may simultaneously receive or transmit on one or multiple CCs depending on the UE's capabilities. When CA is configured, the UE may maintain one RRC connection with the network. The serving cell managing the UE's RRC connection is referred to as the Primary Cell (PCell), and Secondary Cells (SCells) together with the PCell may form a set of serving cells. In CA, a UE may be scheduled via PDCCH over multiple serving cells simultaneously. Cross-carrier scheduling with the Carrier Indicator Field (CIF) allows the PDCCH of a serving cell to schedule resources on another serving cell. That is, a UE receiving a downlink assignment on one CC may receive associated data on another CC.

Carrier Bandwidth Parts

A carrier bandwidth part (BWP) is a contiguous set of physical resource blocks selected from a contiguous subset of the common resource blocks for a given numerology on a given carrier. For downlink, the UE may be configured with up to several (e.g. four) carrier BWPs, with only one carrier BWP active at a given time. For uplink, the UE may similarly be configured with up to several (e.g. four) carrier BWPs, with only one carrier BWP active at a given time. If a UE is configured with a supplementary uplink, then the UE may be additionally configured with up to four carrier BWPs in the supplementary uplink, with only one carrier BWP active at a given time.

Using DCI for Activating Carrier Components

Current NR as well as LTE wireless communication systems activate and deactivate carrier components (CC) in a non-dynamic manner, typically through control messages sent via Media Access Control (MAC) control elements (MAC-CEs). This generally results in a slower response. However, the activation of multiple CCs (or keeping multiple CCs active) can result in excessive power consumption by the device (e.g. a wireless communication device or user equipment device, UE) by keeping all modules in the device running for multiple carriers regardless of scheduling. It would therefore be beneficial to implement a dynamic activation/deactivation process in order to promptly activate/deactivate CCs under various different traffic conditions as warranted by those traffic conditions.

One possible way of dynamically activating CCs is to define/implement a new downlink control information (DCI) message directly for activation/deactivation of CCs. Furthermore, the transmission and reception of DCI messages for the purpose of activating/deactivating a target CC may be devised in a manner that minimizes control overhead.

Currently, DCI messages are transmitted/used for scheduling already activated/active CCs. In other words, no DCI is transmitted for deactivated (or inactive) CCs. The search space (SS) for activated CCs is defined such that DCI may be carried/transmitted in the SS for a target CC. The CIF (carrier indicator field) may be included as part of the DCI to identify scheduled CCs when the respective SSs of multiple CCs overlap (e.g. during cross carrier scheduling). At the present time, a CIF indicating or identifying a deactivated (inactive) CC is prohibited. Upon receiving a CIF identifying a deactivated (inactive) CC, the UE typically treats the received DCI as a false detection. In other words, upon receiving a CIF identifying/indicating a deactivated/inactive CC, the UE does not consider the received DCI to be valid and instead treats it as a false detection.

As mentioned above, in order to achieve a faster response time when activating/deactivating CCs, DCI may be used to schedule deactivated CCs by placing (transmitting) the DCI (targeting the deactivated/inactive CCs) in a search space dedicated to an already activated/active CC. Accordingly, it becomes possible to send/receive DCI for deactivated/inactive CCs, with such a DCI interpreted/regarded as an activation command. The information included in the DCI for the purpose of activating CCs may be generated/parsed in such a way that the size of the DCI allows the DCI to be transmitted in a search space dedicated to (or associated with) an activated/active CC. The DCI for the purpose of activating CCs may be placed in SSs for activated CCs since the UE may blind decode PDCCH for (in) those SSs.

Carrier components may thereby be activated by using DCI in a variety of ways. First, a number of parameters may be defined for CCs that have previously been activated and are thus active CCs (referenced as $CC_i$). These parameters may include the CIF index [CC_ID(i)], the Search Space [SS(i)], and the DCI length [DCI_L(i)]. For an activated $CC_i$ the UE may add SS(i) to a set of SSs in which (or for which) the UE may blindly decode PDCCH, using a DCI length of DCI_L(i). A CC ($CC_i$) may be selected from among activated CCs when the dedicated SS of the selected $CC_i$ is capable of carrying a DCI for a deactivated/inactive CC. The CIF presence may then be configured (added) in the DCI for scheduling that $CC_i$, and the DCI length may be updated to DCI_L(i)=DCI_L(i)+CIF length. One or more CCs (e.g. multiple CCA's) may thereby be selected with a respective CIF presence thus configured for each selected $CC_i$.

A deactivated/inactive CC (referenced as $CC_j$) may then be activated at a target time instance (A). First, a DCI indicating time may be generated. The DCI contents may be formulated/created to fit into the size DCI_L(i). The CIF in the DCI may be set to CC_ID(j), and the DCI may be placed/transmitted in SS(i). A starting time (K0) may be provided for PDSCH (or PUSCH) in order to provide enough transition time for activation. Upon activating the CC ($CC_j$), the UE may perform blind decoding of PDCCH in/for SS(j), which may be considered the new SS or SS associated with or corresponding to $CC_j$. After being activated, the $CC_j$ may be scheduled through either the dedicated (corresponding) SS for $CC_j$ (SS(j)) or an SS dedicated (corresponding) to another CC. For example, the scheduling may take place using a DCI with size DCI_L(j) and may be placed/transmitted in SS(j), as a default mode of scheduling. Alternatively, the DCI may be configured to fit into a size of DCI_L(i) and placed/transmitted in SS(i) to schedule the $CC_j$ in a manner similar to how the $CC_j$ was activated.

FIG. 8

Figure 8:
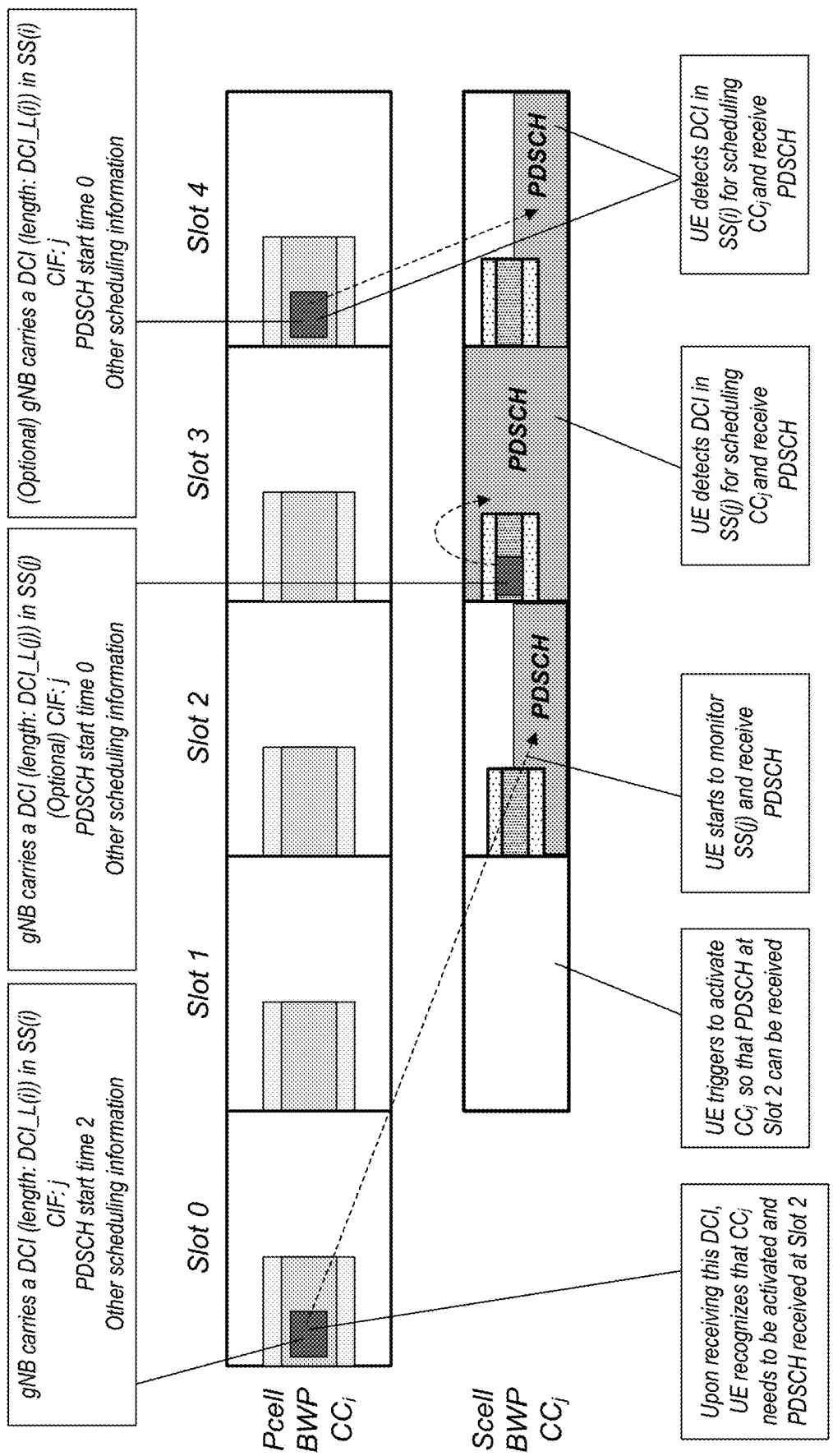
FIG. 8 shows a timing diagram illustrating activation of component carriers by using DCI, according to some embodiments.

The above described process is illustrated in FIG. 8 by way of an example of activating a deactivated CC in an NR wireless communication system. FIG. 8 shows the slots (transmit time units or transmit time intervals) during which activation and subsequent scheduling of a deactivated/inactive secondary cell (Scell) may take place, where a primary cell (Pcell) is already active. The example is provided for a PDSCH, but it should be noted that the process may be similarly performed for a PUSCH as also mentioned above. The DCIs used are highlighted in Pcell Slot 0 and Slot 4, and Scell Slot 3, respectively.

As shown in FIG. 8, at time slot 0, the cell (e.g. a gNB associated with the Pcell) may carry a (first) DCI (of length: DCI_L(i)) in the SS associated with the Pcell (SS(i)), with the CIF in the (first) DCI identifying the target CC ($CC_j$) to be activated, and the PDSCH start time (for a first PDSCH) indicated to occur two (2) time slots later, in slot 2. The (first) DCI may also include additional scheduling information as will be further discussed below. Upon receiving the (first) DCI, the UE may recognize (at least in part from the indication in the CIF) that $CC_j$ needs to be activated and the (first) PDSCH is to be received at Slot 2. Consequently, at slot 1, the UE may trigger to activate $CC_j$ so (the first) PDSCH may be received at Slot 2. At slot 2, the UE begins to monitor the SS(j) and receives the (first) PDSCH.

Scheduling of $CC_j$ may be accomplished either through the SS dedicated (corresponding) to $CC_j$ (SS(j)) or through the SS dedicated (corresponding) to another CC. For example, to schedule $CC_j$, the gNB may carry a (second) DCI (of length: DCI_L(j)) in the SS associated with the Scell (SS(j)), with the CIF again (in this case optionally) identifying $CC_j$, and the PDSCH start time (for a second PDSCH) indicated to occur in the current time slot, slot 3. The (second) DCI may also include additional scheduling information. The UE may then detect the (second) DCI in SS(j) for scheduling $CC_j$ and may receive (the second) PDSCH. Optionally, as illustrated in time slot 4, the gNB may carry a (second) DCI (of length: DCI_L(i)) in SS(i), with the CIF in the (second) DCI identifying $CC_j$, and the PDSCH start time (for the second PDSCH) indicated to occur in the current time slot, slot 4. The (second) DCI may also include additional scheduling information. The UE may detect the (second) DCI in SS(i) for scheduling $CC_j$, and may receive (the second) PDSCH in slot 4.

FIG. 9

Figure 9:
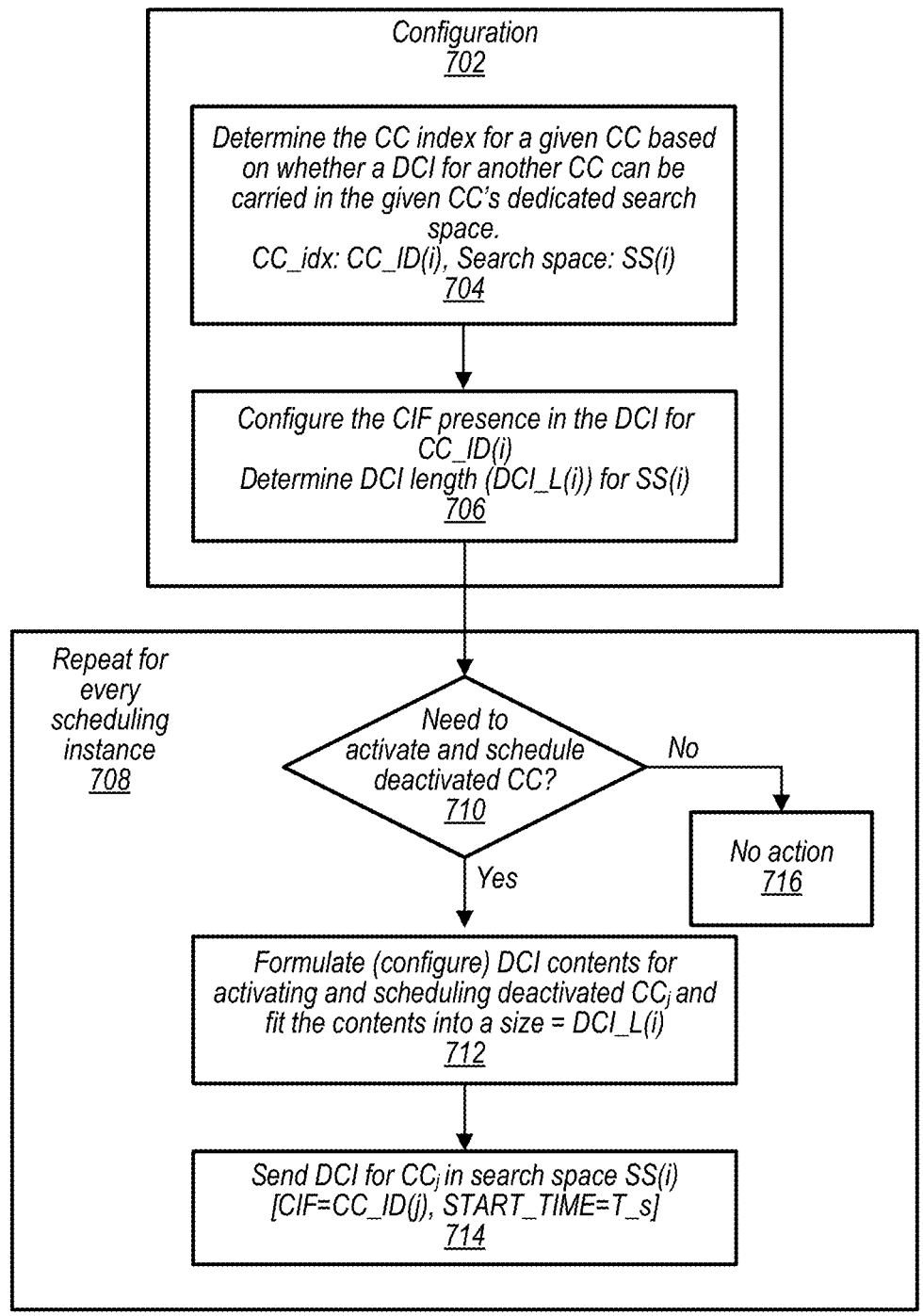
FIG. 9 shows a flowchart illustrating an exemplary generation and transmission of DCI, from the network side, for activating a deactivated/inactive CC, according to some embodiments.

FIG. 9 shows a flowchart illustrating an exemplary generation and transmission of DCI, from the network/gNB side, for activating and scheduling a deactivated/inactive CC, according to some embodiments. During a configuration portion (702), the gNB may determine the CC index for a given CC based on whether a DCI for another CC can be carried in the given CC's dedicated search space. The CC index (CC_idx) may be defined by the CC identification (CC_ID(i)) and, search space: SS(i) (704). The gNB may configure the CIF presence in the DCI for CC_ID(i), and may determine the DCI length (=DCI_L(i)) for SS(i) (706). It should be noted that 704 and 706 may be performed for multiple CCs per the criteria described in 704. Once the configuration (702) is complete, for each scheduling instance (708) the gNB may determine/ascertain whether a deactivated CC needs to be activated and scheduled (710). If no activation and scheduling of a deactivated/inactive CC is required ("No" at 710), no additional action is taken (716). If activation and scheduling of a deactivated/inactive CC is required ("Yes" at 710), the gNB may formulate (configure) the DCI contents for scheduling an inactive/deactivated $CC_j$ to fit into the size (DCI_L(i)) of a DCI placed in SS(i) (712). The gNB may then transmit/send the DCI for $CC_j$ in search space SS(i), with the CIF in the DCI identifying $CC_i$, (CIF=CC_ID(j)), and information indicative of a start time for (a first) PDSCH/PUSCH (START_TIME=T_s).

FIG. 10

Figure 10:
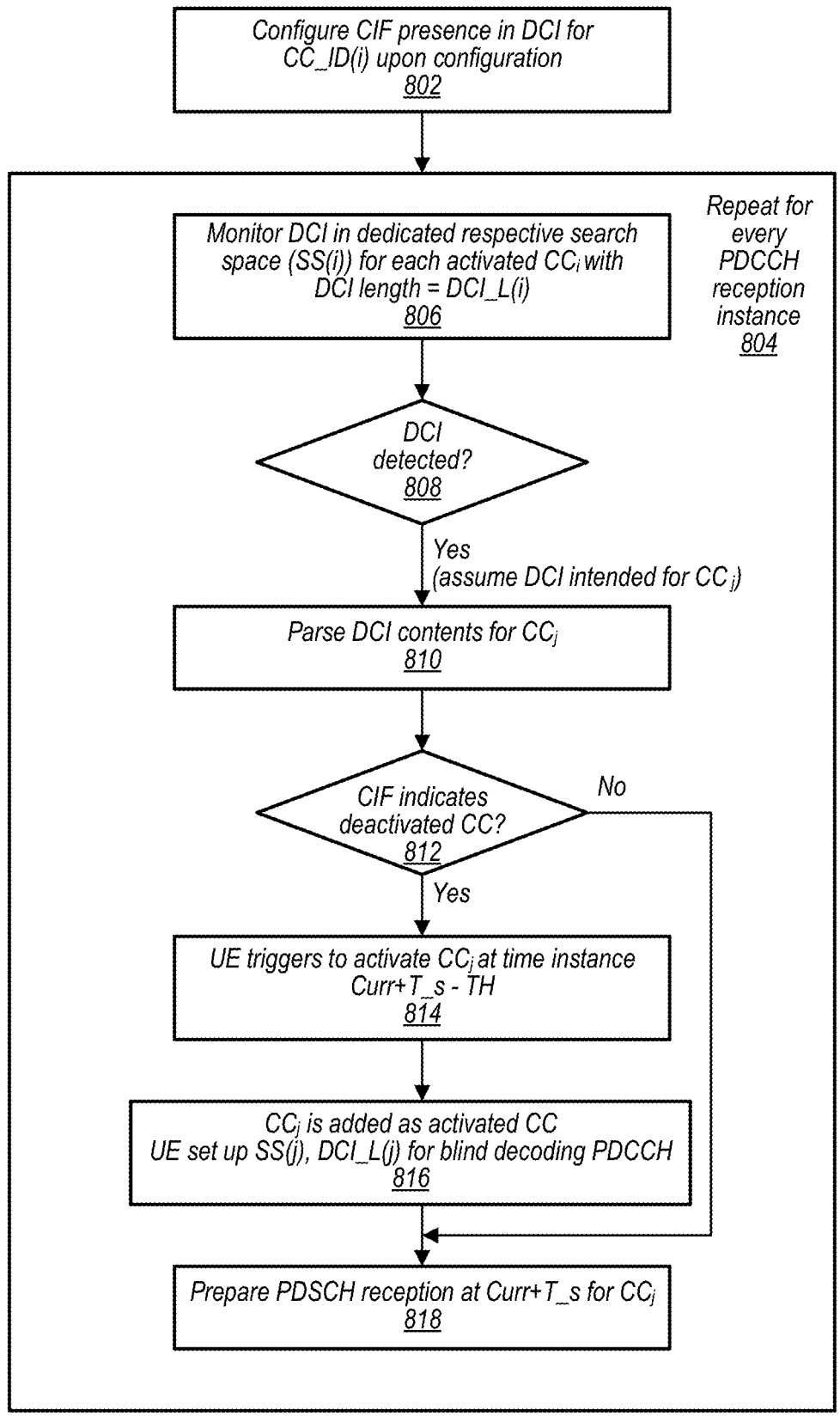
FIG. 10 shows a flowchart illustrating an exemplary generation and transmission of DCI, from the device side, for activating a deactivated/inactive CC, according to some embodiments.

FIG. 10 shows a flowchart illustrating an exemplary generation and transmission of DCI, from the device/UE side, for activating and scheduling a deactivated/inactive CC, according to some embodiments. Upon the CIF presence having been configured in DCI for an active $CC_i$ (CC_ID(i)) (e.g. as detailed in FIG. 9) (802), for every PDCCH reception instance (804) the UE may monitor DCI in the dedicated respective search space (SS(i)) for each activated $CC_i$, with DCI length=DCI_L(i) (806). If a DCI is detected ("Yes" at 808, with the assumption that the DCI is intended for $CC_j$), the UE may parse the contents of the DCI for $CC_j$ (810). If the CIF in the DCI identifies a deactivated/inactive CC ("Yes" at 812), the UE may trigger to activate $CC_j$ at time instance: Current Time+T_s−TH (814), where TH represents the time margin that allows the UE to fully prepare for CC activation. For example, TH provides a time margin that allows the UE to complete all modem operations to get ready to receive PDSCH at the slot defined by "Current Time+T_s". The $CC_j$ is added as an activated CC (i.e., $CC_j$ is activated at the above defined time instance), and the UE may set up SS(j) with DCI_L(j) for blind decoding PDCCH (816). The UE may then prepare PDSCH reception at Current Time+T_s for $CC_j$, based at least on the blind decoding of PDCCH (818). Going back to 812, if the CIF in the DCI does not identify a deactivated/inactive CC ("No" at 812, with the assumption that the identified CC is active), the UE may proceed directly to prepare PDSCH reception at Current Time+T_s for $CC_j$ (818).

Additional Considerations when Using DCI to Activate/Schedule Inactive CCs

The following options may be given consideration when activating a CC using DCI (as discussed above). The target CC may be activated through DCI for either PDSCH or PUSCH by setting the CIF to the target CC. A DCI used for activating a CC may also carry additional scheduling information, e.g. time/frequency resource allocation information which may be either valid or invalid for the target CC. For invalid information, the UE may acquire the activation command from the CIF field alone, while the time information (or timing information) associated with or corresponding to the activation may be determined based on the time (or point in time) at which the DCI was received. The gNB may set CIF to a target CC through a channel state information (CSI) request (using DCI format 0-1), which may be interpreted as an activation command, with the UE preparing to measure CSI on the target CC at a predetermined time.

The DCI length intended for each target CC may be different and may be based on respective RRC configurations and/or BWP size. Furthermore, the size of a DCI for activating $CC_j$ may be the same as the size of a DCI for $CC_i$. In order to accomplish this, some assumptions may be made with respect to sending/receiving a DCI for activating $CC_j$. For example, for the frequency domain resource assignment the size may be based on the BWP size of $CC_i$, with the size of the resource assignment limited by the smaller BWP size from the BWP size of $CC_i$ and the BWP size of $CC_j$ (e.g. min[BWP size of $CC_i$, BWP size of $CC_j$]). Additional (e.g. all other) DCI content may be included based on the high layer configuration of $CC_i$.

FIG. 11 shows a table illustrating the exemplary contents of a DCI used for activating a CC, according to some embodiments. The elements in bold indicate values relevant when using the DCI for activating CCs.

Deactivation of CCs may take place in one or more ways. For example, deactivation may be performed using a timer based approach, according to which if no grant is received for a specified number of slots from reception of the last (most recent) PDSCH, an activated CC may be deactivated. It should be noted that in at least some embodiments, Pcells may not be deactivated in this manner. The value of the specified number (of slots) may be configured by RRC. In some embodiments, deactivation may be performed using a signaling approach, according to which deactivation may be effected (enabled) by adding an indicator (e.g. a one-bit indicator; a "deactivation flag") in DCI.

Dynamic C-DRX Configuration for Tradeoff Between Power Savings and Communications Traffic Power consumption for PDCCH grant monitoring is one key factor in improving UE power savings (or to reduce UE power consumption). As also previously mentioned with respect to FIG. 5, connected-mode DRX (C-DRX) is an important feature in implementing power saving designs. In the current NR specifications, C-DRX design remains the same as it was in LTE. However, a more flexible C-DRX design may help ease scheduling difficulties by eliminating the need for extra power saving signals.

Switching between bandwidth parts (BWPs) may help to balance wireless communications traffic efficiency with power savings. For PDCCH grant monitoring, operating a UE at a smaller BWP benefits power savings, while a larger BWP is preferable during wireless data communication. When data is received, the DCI may point the UE to another BWP for data transmission and switch back to a default BWP thereafter, for example once a BWP-inactivity-timer expires.

There is no universally accepted 'best' C-DRX configuration for the many different types and kinds of requests. For example, a longer C-DRX cycle and shorter inactivity timer may be better for power savings (for conserving power or reducing power usage) while less desirable for UE data traffic (for communication efficiency of the UE). Current C-DRX configurations include short/long C-DRX cycles/inactivity thresholds, and are not flexible enough to satisfy various QoS request/traffic types for different end user usage models. For example, based on the current NR specification, gNBs may configure up to four (4) BWPs for each UE and switch among/between them using DCI, for different UE traffic load/measurement results. Naturally, different BWPs for each UE may have different 'best' C-DRX configurations based on the traffic and quality. For example, a larger BWP may be used for higher traffic load and thus shorter C-DRX cycles, and a BWP with worse quality (e.g. worse signal conditions) may need to implement a longer inactivity timer to deal with higher packet loss rate.

It would therefore be desirable to implement a systematic design to coordinate BWP and C-DRX for a dynamic balance between traffic (wireless communication efficiency or data traffic) and power consumption/use. Accordingly, in some embodiments, a dynamic C-DRX design may be implemented for balancing data traffic needs (e.g. to improve communication efficiency) with power consumption of a device.

FIG. 6

In some embodiments, one respective DRX setup may be configured for each BWP of multiple (e.g. up to 4) BWPs associated with (or assigned to) a UE. The respective DRX setups may be configured through (via) RRC messages. When the UE switches between BWPs (whether through a received DCI or based on a timer), the UE may adopt and begin using the respective C-DRX configuration associated with the BWP. Different C-DRX configurations may be selected based on various characteristics of the specific BWP (e.g., subcarrier spacing, bandwidth, traffic type etc.).

Figure 6:
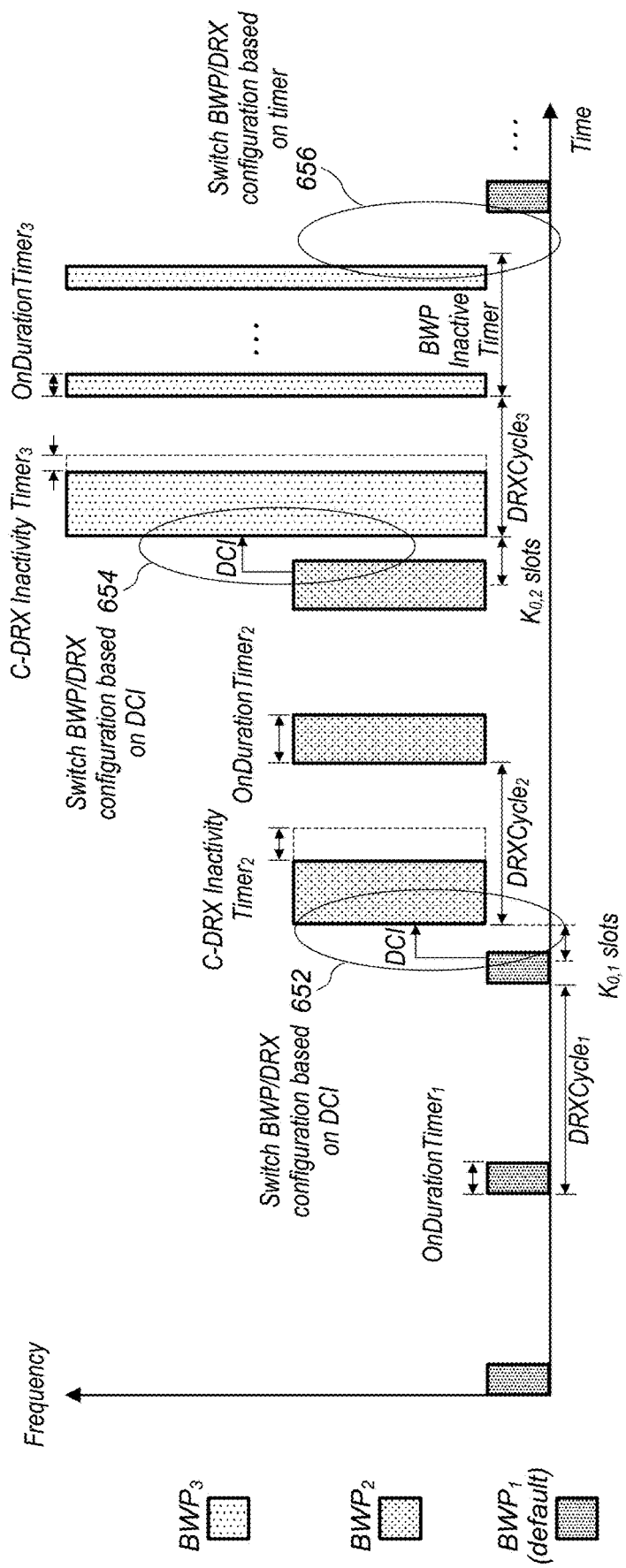
FIG. 6 shows a timing diagram illustrating a UE switching between BWPs having different respective one or more associated C-DRX configurations, according to some embodiments.

As illustrated in FIG. 6, a UE may operate in a (first) BWP according to a given (first) C-DRX configuration with corresponding parameters (e.g. DRX cycle length, On-Duration [timer], etc.). The parameters corresponding to the first C-DRX configuration are labeled with index number "1". When the UE switches to a different (second) BWP (e.g. through received DCI (at 652), the UE may also switch to a different (second) C-DRX configuration corresponding to the second BWP, and begin operating according to the different (second) C-DRX configuration corresponding to the second BWP, with corresponding parameters (e.g. DRX cycle length, On-Duration [timer], Inactivity Timer, etc). The parameters corresponding to the second C-DRX configuration are labeled with index number "2". When the UE switches to yet a different (third) BWP (e.g. through received DCI (at 654), the UE may also switch to a different (third) C-DRX configuration corresponding to the third BWP, and the UE may begin operating according to the different (third) C-DRX configuration corresponding to the third BWP, with corresponding parameters (e.g. DRX cycle length, On-Duration [timer], Inactivity Timer, etc). The parameters corresponding to the third C-DRX configuration are labeled with index number "3". The UE may switch to a different BWP (in the illustrated example the original, default BWP) based on a timer, for example the indicated "BWP Inactive Timer" (at 656). In this case the UE may switch to the different BWP upon expiration of the timer, e.g., once a specified time period (or time period of specified duration) has elapsed from when the BWP Inactive Timer was started. The default BWP may have a default C-DRX configuration associated with it, and when switching to the default BWP, the UE may also switch to that default C-DRX configuration and begin operating according to the default C-DRX configuration.

In some embodiments, more than one C-DRX configuration may be established for each BWP. As already indicated above, one default C-DRX configuration may be specified among the established C-DRX configuration candidates for each BWP. When the UE switches between BWPs based on DCI, an extra field included in the DCI may specify which of the various different C-DRX configurations established for the given BWP are to be activated. When the UE switches between BWPs based on a timer, the default C-DRX configuration may be used (e.g. as shown at 656 in FIG. 6). The base station (e.g. gNB) may therefore be enabled to serve multiple traffic types on the same BWP with different C-DRX configurations. This may also enable the NW (e.g. gNB) to change the C-DRX configuration using DCI without changing the BWP. Alternatively, a MAC-CE may be used to change the C-DRX configuration for the BWP. Different UEs on the same BWP may have different measurement results and thus may be assigned different respective C-DRX configurations for the same BWP. For example, a UE measuring a lower signal-to-noise ratio (SNR) on the same BWP may be guaranteed a longer DRX On-Duration and inactivity timer to reduce its grant-miss rate (i.e., reduce the rate at which the UE may miss grants).

FIG. 7

Figure 7:
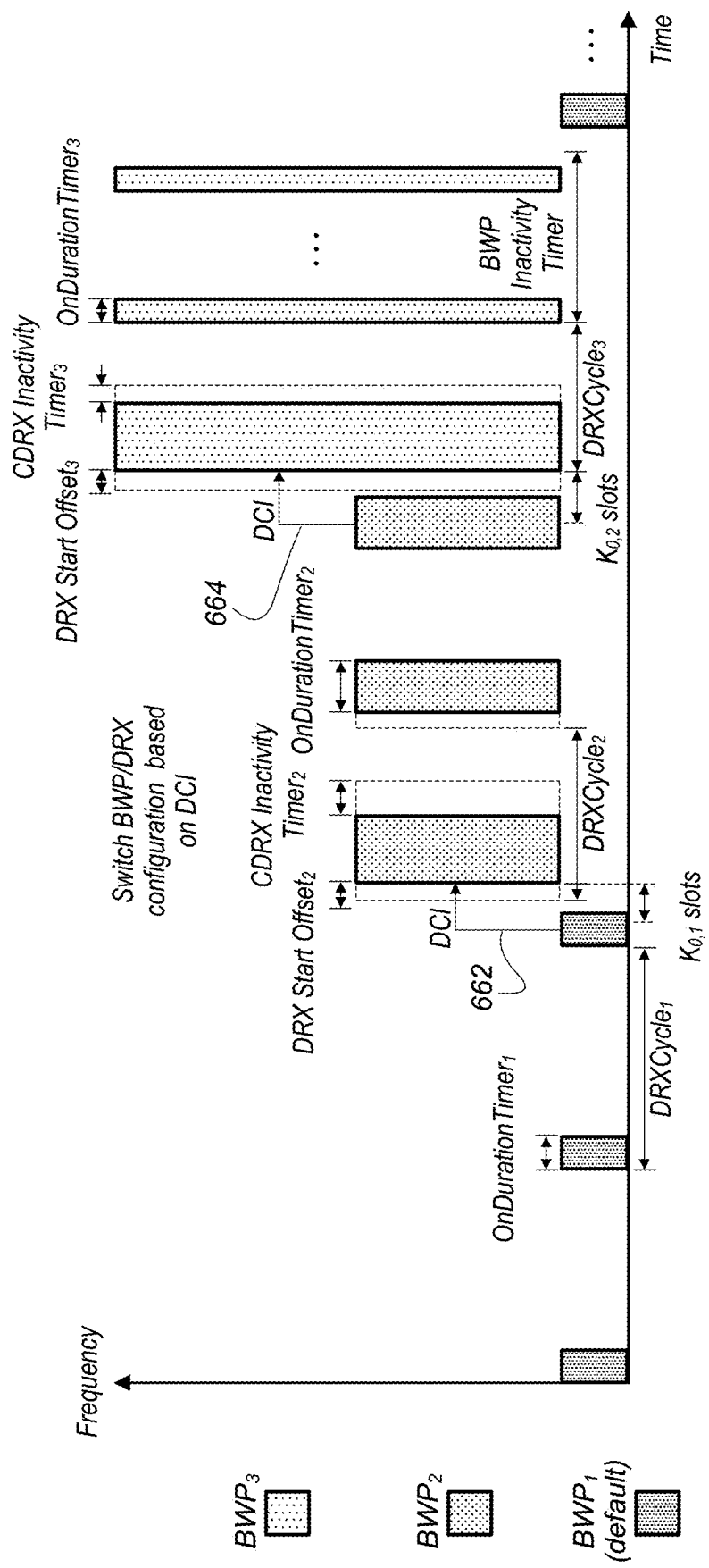
FIG. 7 shows a timing diagram illustrating a UE switching between BWPs with long DRX cycles being multiples of short DRX cycles, according to some embodiments.

In some embodiments, long DRX cycles may be multiples of short(er) DRX cycles. In this manner, when a UE switches BWP/DRX using DCI, it may be in the DRX On-duration of another C-DRX configuration, as illustrated in FIG. 7. As shown in FIG. 7, a UE may operate in a (first) BWP according to a given (first) C-DRX configuration with corresponding parameters (e.g. DRX cycle length, On-Duration [timer], etc.). The parameters corresponding to the first C-DRX configuration are labeled with index number "1". When the UE switches to a different (second) BWP (at 662, in this case via received DCI), the UE may also switch to a different (second) C-DRX configuration corresponding to the second BWP, and the UE may begin operating according to the different (second) C-DRX configuration corresponding to the second BWP, with corresponding parameters (e.g. DRX cycle length, On-Duration [timer], Inactivity Timer, etc) labeled with index number "2". However, as shown in FIG. 7, when the UE switches to the second BWP (and thus to the second C-DRX configuration), the UE may already be in the DRX cycle defined by the second C-DRX configuration (DRX Cycle$_2$), as opposed to beginning to operate at the beginning of DRX Cycle$_2$.

Alternatively, such restriction may not be necessary if the first grant in the target BWP/DRX is considered as the DRX cycle start offset parameter, as illustrated in FIG. 7 when the UE is switching to a different (third) BWP (at 664). As indicated, in this case, because the first grant is considered as DRX Start Offset$_3$, the UE is not switching to the different (third) BWP during the DRX Cycle associated with the C-DRX configuration corresponding to the third BWP (DRX Cycle$_3$) but prior to the beginning of that DRX cycle, and therefore may begin operating according to the third C-DRX configuration at the beginning of DRX Cycle$_3$.

Various embodiments of dynamic C-DRX configuration (as described above) facilitate a less problematic distribution of different UEs in the time domain.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processing element configured to cause a device to:
monitor a first search space corresponding to an active first component carrier;
detect first control information as a result of the monitoring of the first search space, wherein the first control information comprises a carrier indicator identifying an inactive second component carrier; and
activate the inactive second component carrier to make it an active second component carrier at least in response to detecting the first control information.

2. The apparatus of claim 1, wherein the processing element is configured to further cause the device to set up a second search space corresponding to the active second component carrier, and monitor the second search space.

3. The apparatus of claim 2, wherein the processing element is configured to further cause the device decode a physical control channel in the second search space.

4. The apparatus of claim 3, wherein the processing element is configured to further cause the device to receive a physical data channel at least in response to the decoding of the physical control channel.

5. The apparatus of claim 4, wherein the processing element is configured to further cause the device to receive the physical data channel at a point in time determined based at least on timing information comprised in the first control information.

6. The apparatus of claim 2, wherein the processing element is configured to further cause the device to:
detect second control information as a result of the monitoring of the second search space, wherein the second control information comprises a carrier indicator identifying the active second component carrier; and
schedule the active second component carrier at least in response to detecting the second control information.

7. The apparatus of claim 1, wherein the processing element is configured to further cause the device to:
detect, subsequent to the activation of the inactive second component carrier, second control information as a result of the monitoring of the first search space, wherein the second control information comprises a carrier indicator identifying the active second component carrier; and
schedule the active second component carrier at least in response to detecting the second control information.

8. The apparatus of claim 1, wherein the processing element is configured to further cause the device to:
operate in a first bandwidth part of the active first component carrier according to a first communication configuration associated with the first bandwidth part;
detect second control information as a result of the monitoring of the first search space; and
switch, in response to at least the second control information:
from operating in the first bandwidth part to operating in a second bandwidth part of the active first component carrier; and
from operating according to the first communication configuration to operating according to a second communication configuration in the second bandwidth part, wherein the second communication configuration is associated with the second bandwidth part.

9. The apparatus of claim 8, wherein the second communication configuration is comprised in a first set of communication configurations associated with the second bandwidth part;
wherein the processing element is configured to further cause the device to select the second communication configuration from among the set of communication configurations.

10. The apparatus of claim 9, wherein the processing element is configured to further cause the device to select the second communication configuration based at least on an indication comprised in the second control information.

11. An apparatus comprising:
a processing element configured to cause a network device to:
identify an active first component carrier having a corresponding first search space suitable for transmitting control information associated with other component carriers;
configure first control information to be used by a second device to activate and schedule a deactivated second component carrier to make it an active second component carrier; and
transmit the first control information in the first search space.

12. The apparatus of claim 11, wherein the processing element is configured to further cause the network device to configure the first control information to include:
a carrier indicator identifying the deactivated second component carrier; and
a start time indicative of when the second device is to receive a physical data channel.

13. The apparatus of claim 11, wherein the processing element is configured to further cause the network device to configure and transmit the first control information for each scheduling instance of a plurality of scheduling instances.

14. The apparatus of claim 11, wherein the processing element is configured to further cause the network device to:
   configure, for transmission in the first search space, second control information to be used by the second device to schedule the active second component carrier; and
   transmit the second control information in the first search space.

15. The apparatus of claim 11, wherein the processing element is configured to further cause the network device to:
   configure, for transmission in a second search space associated with the active second component carrier, second control information to be used by the second device to schedule the active second component carrier; and
   transmit the second control information in the second search space.

16. A device comprising:
   radio circuitry configured to facilitate wireless communications of the device over a wireless network; and
   a processing element communicatively coupled to the radio circuitry and configured to cause the device to:
      operate in a first bandwidth part of a frequency band of the wireless network according to a first communication configuration associated with the first bandwidth part;
      switch from operating in the first bandwidth part to operating in a second bandwidth part of the of frequency band; and
      switch from operating according to the first communication configuration to operating according to a second communication configuration in the second bandwidth part, wherein the second communication configuration is associated with the second bandwidth part.

17. The device of claim 16, wherein the processing element is configured to further cause the device to switch to operating in the second bandwidth part and to operating according to the second communication configuration in response to one of:
   receiving control information from the wireless network, wherein the control information indicates the device is to switch to operating in the second bandwidth part and to operating according to the second communication configuration; or
   expiration of a bandwidth part inactivity timer.

18. The device of claim 16, wherein the second communication configuration is comprised in a first set of communication configurations associated with the second bandwidth part;
   wherein the processing element is configured to further cause the device to select the second communication configuration from among the set of communication configurations.

19. The device of claim 17, wherein the processing element is configured to further cause the device to select the second communication configuration based at least on an indication comprised in control information received from the wireless network, wherein the control information indicates that the device is to switch to operating in the second bandwidth part and to operating according to the second communication configuration.

20. The device of claim 16, wherein the first communication configuration comprises a first connected discontinuous reception (C-DRX) configuration and the second communication configuration comprises a second C-DRX configuration.

* * * * *